(12) United States Patent
Lundquist et al.

(10) Patent No.: US 7,419,649 B2
(45) Date of Patent: Sep. 2, 2008

(54) MACRORETICULAR CARBONACEOUS MATERIAL USEFUL IN ENERGY STORING DEVICES

(76) Inventors: Eric Gustave Lundquist, 107 Churchhill Cir., North Wales, PA (US) 79454; Garth R. Parker, 107 Twining Rd., Lansdale, PA (US) 19446

( * ) Notice: Subject to any disclaimer, the term of this patent is extended or adjusted under 35 U.S.C. 154(b) by 686 days.

(21) Appl. No.: 10/933,010

(22) Filed: Sep. 2, 2004

(65) Prior Publication Data

US 2005/0058589 A1    Mar. 17, 2005

Related U.S. Application Data

(60) Provisional application No. 60/502,590, filed on Sep. 12, 2003.

(51) Int. Cl.
*C01B 31/00* (2006.01)
*H01M 4/58* (2006.01)
*H01M 4/90* (2006.01)
*H01M 4/96* (2006.01)

(52) U.S. Cl. ............................ 423/445 R; 429/231.8; 977/948

(58) Field of Classification Search .............. 423/445, 423/445 R; 429/231.8; 977/948
See application file for complete search history.

(56) References Cited

U.S. PATENT DOCUMENTS

| 4,040,990 | A | * | 8/1977 | Neely | 521/29 |
| 4,839,331 | A | * | 6/1989 | Maroldo et al. | 502/416 |
| 4,873,218 | A | * | 10/1989 | Pekala | 502/418 |
| 4,957,897 | A | * | 9/1990 | Maroldo et al. | 502/432 |
| 5,143,889 | A | * | 9/1992 | Takahiro et al. | 502/427 |
| 5,260,855 | A | * | 11/1993 | Kaschmitter et al. | 361/502 |
| 5,328,936 | A | * | 7/1994 | Leifholtz et al. | 521/65 |
| 5,393,619 | A | * | 2/1995 | Mayer et al. | 429/152 |
| 5,426,199 | A | * | 6/1995 | Lundquist | 554/169 |

(Continued)

FOREIGN PATENT DOCUMENTS

EP    1 049 116 A1    11/2000

(Continued)

OTHER PUBLICATIONS

Tamon, et al., Control of Mesoporous Structure of Organic and Carbon Aerogels, Carbon, vol. 36, No. 9, pp. 1257-1262 (1998).

(Continued)

*Primary Examiner*—Timothy C. Vanoy
*Assistant Examiner*—Serena L Hanor
(74) *Attorney, Agent, or Firm*—Thomas S. Deibert

(57) ABSTRACT

The present invention relates to an energy storage device comprising a macroreticular carbonaceous material having a distribution of micropores, mesopores and macropores wherein the macroreticular carbonaceous material has a total surface area of from greater than 500 $m^2/g$ to 2500 $m^2/g$ and wherein 20% to 80% of the total surface area is due to pores with diameters of from 17 angstroms to 100,000 angstroms. In addition, the present invention relates to an energy storage device comprising a macroreticular carbonaceous material having at least one first distinct peak representing a pore size of less than or equal to 20 angstroms when measured utilizing H-K dv/dlog(W) pore size distribution and at least one second distinct peak representing a pore size greater than 20 angstroms when measured utilizing BJH dv/dlog(D) pore size distribution.

7 Claims, 1 Drawing Sheet

U.S. PATENT DOCUMENTS

| | | | | |
|---|---|---|---|---|
| 5,475,154 | A * | 12/1995 | Lundquist et al. | 568/727 |
| 5,726,118 | A * | 3/1998 | Ivey et al. | 502/417 |
| 5,905,629 | A * | 5/1999 | Alford | 361/502 |
| 5,945,084 | A * | 8/1999 | Droege | 423/447.4 |
| 5,956,225 | A * | 9/1999 | Okuyama et al. | 361/502 |
| 5,990,041 | A * | 11/1999 | Chung et al. | 502/416 |
| 6,043,183 | A * | 3/2000 | Alford | 502/180 |
| 6,064,560 | A * | 5/2000 | Hirahara et al. | 361/502 |
| 6,297,293 | B1 * | 10/2001 | Bell et al. | 521/99 |
| 6,547,990 | B2 * | 4/2003 | Shinozaki et al. | 252/502 |
| 6,574,092 | B2 * | 6/2003 | Sato et al. | 361/502 |
| 6,592,838 | B1 * | 7/2003 | Nomoto et al. | 423/445 R |
| 6,631,073 | B1 * | 10/2003 | Sakata et al. | 361/502 |
| 6,719,147 | B2 * | 4/2004 | Strano et al. | 210/490 |
| 6,865,068 | B1 * | 3/2005 | Murakami et al. | 361/502 |
| 6,867,275 | B2 * | 3/2005 | Alexander et al. | 526/336 |
| 7,098,252 | B2 * | 8/2006 | Jiang et al. | 521/25 |
| 7,202,195 | B2 * | 4/2007 | Cannon et al. | 502/416 |
| 2002/0048144 | A1 * | 4/2002 | Sugo et al. | 361/502 |
| 2002/0065333 | A1 * | 5/2002 | Bell et al. | 521/99 |
| 2002/0141932 | A1 * | 10/2002 | Klett et al. | 423/445 R |
| 2003/0026753 | A1 * | 2/2003 | Fujino et al. | 423/445 R |
| 2003/0153636 | A1 * | 8/2003 | Dietz et al. | 521/50 |
| 2003/0157014 | A1 * | 8/2003 | Wang et al. | 423/445 R |
| 2003/0187080 | A1 * | 10/2003 | Jiang et al. | 521/25 |

FOREIGN PATENT DOCUMENTS

| | | |
|---|---|---|
| EP | 1 168 389 A1 | 1/2002 |

OTHER PUBLICATIONS

Zhu, et al., Pore Size Control in Cross-Linked Polymer Resins by Reverse Micellar Imprinting, Macromolecules. vol. 30, No. 10, pp. pg. 3031-3035 (1997).

Menger, et al., Synthesis of Porous Polystyrene with Chemically Active Surfaces, Journal of the American Chemical Society, vol. 112, No. 18 pp. 6723-6724 (1990).

* cited by examiner

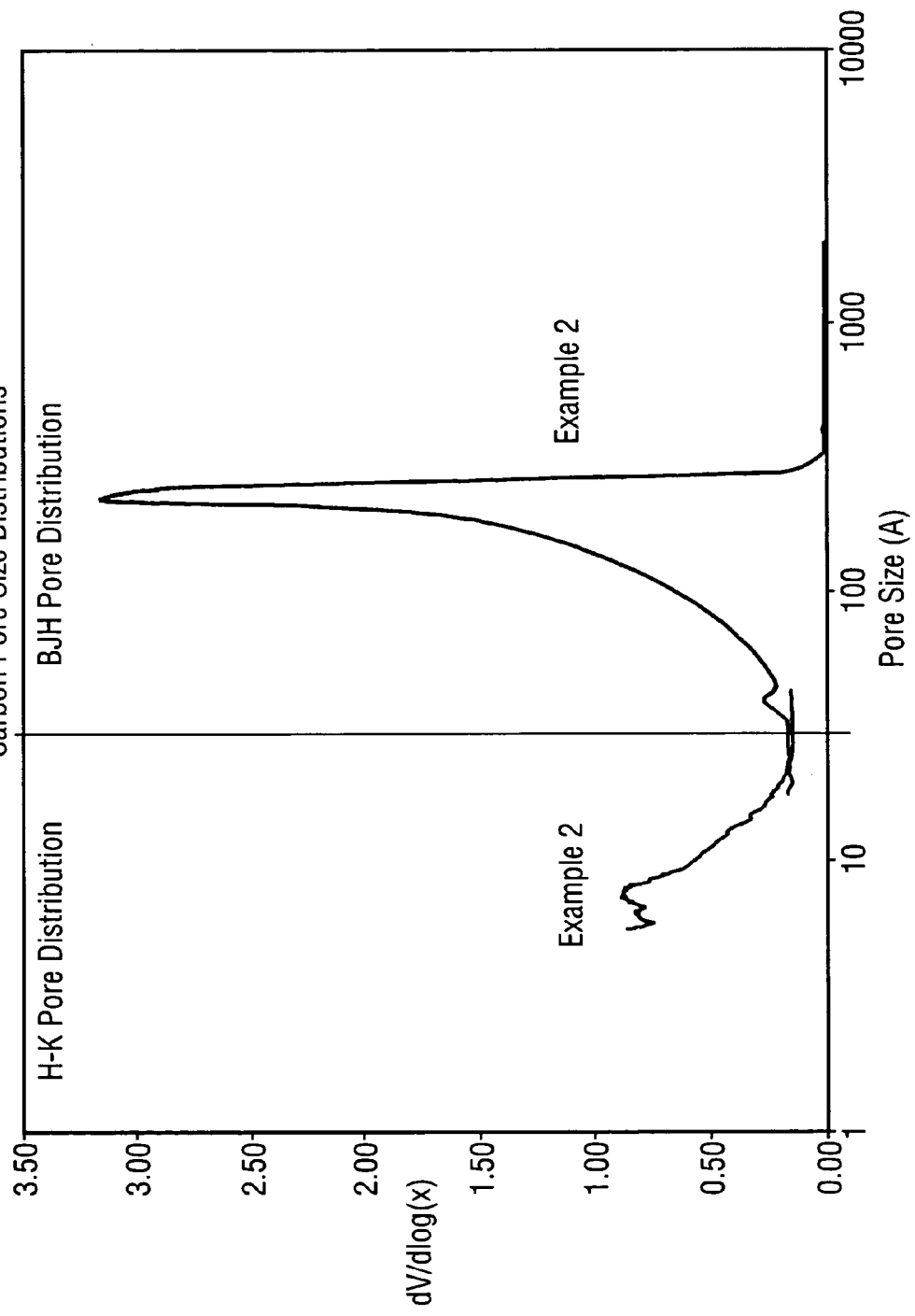

MACRORETICULAR CARBONACEOUS MATERIAL USEFUL IN ENERGY STORING DEVICES

Cross Reference to Related Patent Applications

This is a non-provisional application of prior pending U.S. Provisional Application Ser. No. 60/502,590 filed on Sep. 12, 2003.

The present invention relates to macroreticular carbonaceous materials having micropores, mesopores and macropores and high surface area. These macroreticular carbonaceous materials can be used in the field of energy storage applications such as batteries, fuel cells and as electrodes, such as in electric double layer capacitors useful for energy storage, power applications and for capacitive water deionization.

High surface area, conducting carbonaceous materials have received considerable attention as materials useful in energy applications. Electric double layer capacitors (EDLC, "capacitors") based on extremely high surface area carbons or carbon cloths have been developed and are commercially available. Although carbons with surface areas of over 2000 m$^2$/g have been achieved, the capacitors made utilizing these carbons exhibit significantly lower capacitances than would be expected. This inability to obtain the expected capacitance is believed to be due to the nature of the pore structure of these high surface area materials, a primarily microporous (<20 angstroms) pore structure. Because of the primarily microporous pore structure, electrolyte solutions used in electrodes are unable to access all of the available surface area of the carbon material or form an electric double layer in regions where the pore size and double layer are on the same size scale. Additionally, these high surface area carbons with their microporous structures are often slow to release their stored charge, giving long (>0.1 seconds) discharge response times. This long response time is disadvantageous to applications requiring high pulse power such as electronic applications and in applications conducted at high frequencies such as electrical power stabilization and regulation.

Carbon based capacitors typically experience decreases in capacitance of up to 100% in going from 0.1 Hz to 1000 Hz. Thus, the need for capacitors to have both high capacitance and rapid energy response rates is recognized as being critical to high pulse power performance. As such, a Figure of Merit (FOM) measurement has been developed by J. R. Miller, *Pulse Power Performance of Electrochemical Capacitors: Technical Status of Present Commercial Devices*, Proceedings of the 8th International Seminar on Double Layer Capacitors and Similar Energy Storage Devices, Deerfield Beach, Fla., 1998 to quantify the pulse power performance of capacitors using different carbons. The FOM is based on impedance measurements and is determined by identifying the frequency $f_o$ at which a capacitor's impedance reaches a −45 degree phase angle then taking the reciprocal of this frequency to obtain a characteristic capacitor response time $T_o$. The value of the imaginary part of the impedance Z" at $f_o$ is then used to calculate the available capacitor energy using the equation $E_o = \frac{1}{2} CV^2$, where $C = -1/(2\pi f_o Z")$ and V is the rated voltage of the capacitor. Finally, available energy per mass $E_o/M$ and energy per volume $E_o/v$ are plotted against response time $T_o$.

In the capacitive deionization of water, a double layer is formed around an anode and cathode. Ions in water are then attracted to the electrode and electrostatically held there (adsorption/deionization) until the power supply is turned off or the circuit is shorted. The ions are then released and diffuse out of the porous electrode (regeneration). Since the dielectric layer formed is proportional to the ionic strength of the electrolyte and in this case the electrolyte is water, often at an ionic strength of less than 10 meq/L, the dielectric layer formed is more diffuse and thus a larger pore size is required. Additionally, the pore size needs to be large enough so the ions can rapidly diffuse out during the regeneration step.

There has been an attempt to solve the aforementioned problem by developing carbon foam materials produced by the carbonization of organic aerogel foam precursors. Specifically, U.S. Pat. No. 5,945,084, discloses carbon foams containing pores between 5 and 50 nm (mesopores). These materials have surface areas of 200-800 m$^2$/g and are produced by the carbonization of resorcinol-formaldehyde organic aerogel foams produced at resorcinol/catalyst ratios of greater than 1000. However, the problem in U.S. Pat. No. 5,945,084 is that the ultimate surface area of the carbon foams is low due to the presence of only mesopores. The lowered surface area reduces the capacitance making it less efficient for capacitive deionization and energy storage applications.

European Patent Application 1 049 116 (A1) attempts to solve this problem by utilizing a carbonaceous material where the volume relationship between micropores, mesopores and macropores is optimized to give a balance of capacitance properties. The volume of pores between 10 and 200 angstroms is maximized while the volume of pores greater than 200 angstroms is minimized, since these pores reduce the bulk density of the carbon and thus lower the capacitor's energy density.

To obtain the carbonaceous material of EP 1 049 116, a liquid thermosetting resin is used which is required to contain a volatile component. This volatile component is a solvent, dimer or trimer with a boiling point of from 120 to 400° C. The volatile component vaporizes during the carbonization process creating the porous carbons with the described pore volumes. Use of this required volatile component creates problems in the manufacturing process of this carbonaceous material. These problems include the need to remove or recover the volatile component that volatilizes from the carbonization process and the cost associated with the volatile component that is not recovered.

The problems associated with U.S. Pat. No. 5,945,084 and EP 1 049 116 have now been overcome by the present invention. It has now been discovered that carbonaceous material formed from macroreticular resins or polymers eliminates the problems associated with the use of a volatile component in forming carbonaceous material. In addition, the use of macroreticular resins or polymers as precursors to the carbonaceous material useful in the present invention leads to macroreticular carbonaceous materials having a surface area of greater than 500 m$^2$/g with said surface area being distributed between the macropores, mesopores and micropores which are useful as electrodes for capacitive deionization and energy storage applications. This pore distribution allows for the effective utilization of the macroreticular carbonaceous material's surface area giving high capacitance, short discharge response times and high power performance. The present invention relates to an energy storage device comprising a macroreticular carbonaceous material having a distribution of micropores, mesopores and macropores wherein the macroreticular carbonaceous material has a total surface area of from greater than 500 m$^2$/g to 2500 m$^2$/g and wherein 20% to 80% of the total surface area is due to pores with diameters of from 17 angstroms to 100,000 angstroms.

BRIEF DESCRIPTION OF THE DRAWING

FIG. 1 is a plot of the H-K and BJH pore size distribution of the macroreticular carbonaceous material of Example 2.

The pore distribution of the macroreticular carbonaceous material useful in the present invention can also be classified as having more than one peak, for example bimodal, having a first distinct peak in the Horvath-Kawazoe (H-K) adsorption dv/dlog(W) pore size distribution at a pore size of less than or equal to 20 angstroms and a second distinct peak in the Barrett-Joyner-Halenda (BJH) desorption dv/dlog(D) pore size distribution representing a pore size greater than 20 angstroms. Thus the present invention also relates to an energy storage device comprising a macroreticular carbonaceous material wherein measurement of pore size distribution of the macroreticular carbonaceous material yields at least one first distinct peak representing a pore size of less than or equal to 20 angstroms when measured utilizing H-K dv/dlog(W) pore size distribution and at least one second distinct peak representing a pore size greater than 20 angstroms when measured utilizing BJH dv/dlog(D) pore size distribution. Another example of the at least one first distinct peak is a peak representing a pore size of less than or equal to 17 angstroms. Other examples of the at least one second distinct peak is a peak representing a pore size greater than 25 angstroms, greater than 30 angstroms, greater than 35 angstroms, greater than 40 angstroms, greater than 45 angstroms, greater than 50 angstroms or greater than 100 angstroms. The at least one first peak contributes to the high surface area and capacitance of the carbonaceous material while the at least one second peak has been found to contribute to the rapid discharge times and high power performance. An example of a bimodal distribution of the macroreticular carbonaceous material useful in the present invention is presented in FIG. 1.

In another aspect of the present invention, the energy storage device of the present invention can contain a carbonaceous material wherein measurement of pore size distribution of the carbonaceous material yields at least one first distinct peak representing a pore size less than or equal to 20 angstroms when measured utilizing H-K dv/dlog(W) pore size distribution and at least one second distinct peak representing a pore size greater than 125 angstroms when measured utilizing BJH dv/dlog(D) pore size distribution. Another example of the at least one second distinct peak is one representing a pore size greater than 15o angstroms when measured utilizing BJH dv/dlog(D) pore size distribution. An example of this carbonaceous material is non-macroreticular and another example is macroreticular.

The macroreticular carbonaceous material useful in the present invention can be formed from macroreticular resin or polymer precursors. The term macroreticular and macroporous are often used interchangeably in the ion exchange porous polymer art. When referring to carbons, polymers or resins, the term macroreticular/macroporous can be defined as a structure with an open, continuous pore network containing macropores, mesopores and micropores. As defined by IUPAC nomenclature, micropores are pores with diameters less than 20 angstroms, mesopores are pores with diameters from 20 to 500 angstroms and macropores are pores with diameters greater than 500 angstroms. Macroreticular resins or polymers are different, for example, from a polymer foam produced by the dispersion of gas bubbles in a material or polymer aerogels formed by the use of super critical carbon dioxide techniques. Specifically, polymer foams contain a narrow distribution of pore sizes and therefore, when utilizing polymer foams as precursors to a carbonaceous material, it is difficult to achieve an optimum distribution of macropores, mesopores and micropores for use in the present invention.

Macroreticular polymer precursors to the macroreticular carbonaceous material useful in the practice of the present invention include, but are not limited to, phenol formaldehyde condensate copolymers, resorcinol formaldehyde condensate copolymers, crosslinked and non-crosslinked polyacrylonitrile copolymers, sulfonated crosslinked polystyrene copolymers, modified crosslinked polystyrene copolymers, crosslinked sucrose, polyfurfurylalcohol and polyvinyl chloride. The formation of macroreticular polymer precursors is disclosed in U.S. Pat. No. 4,221,871 and crosslinked macroreticular phenol/formaldehyde condensate polymers have been described in *Ind. Eng. Chem. Prod. Res. Dev.* 1975, 14, 2, 108-112.

The macroreticular polymers can be further modified by the addition of additives. Additives include metal hydroxides, amines, ammonium hydroxides, mineral acids, Lewis acids and crosslinking agents. These additives can swell or shrink the existing macroreticular polymer structure changing the polymer's pore structure and density. Since the carbonaceous material of the present invention derives its pore structure from the macroreticular polymer precursor, these changes in structure and density also are seen in the resulting carbon. Therefore, another aspect of the present invention is a process for making a carbonaceous material comprising pyrolysis of a polymer wherein pore size and density can be changed by swelling or shrinking the pores of the polymer prior to pyrolysis. Examples of alkali hydroxides include but are not limited to sodium hydroxide, lithium hydroxide, potassium hydroxide, barium hydroxide, magnesium hydroxide. Examples of amines include ammonia and trimethyl amine. Examples of ammonium hydroxides include but are not limited to ammonium hydroxide, tetraethylammonium hydroxide, and tetrabutylammonium hydroxide. Examples of mineral acids include but are not limited to sulfuric acid, phosphoric acid and boric acid. Examples of Lewis acids include but are not limited to zinc dichloride, aluminum chloride and tin dichloride. Crosslinking agents include but are not limited to dianhydrides, urea, diisocyanates. Additionally additives that undergo both graphitizing and nongraphitizing reactions upon carbonization can be added to the macroreticular polymer. Such additives include but are not limited to cellulose, carbon fibers, carbon nanotubes, sucrose, polyacrylonitrile, pitch, coal tar, coal tar pitch, anthracene, lignin and polyvinylchloride.

The macroreticular polymers can be produced or formed into a variety of shapes or objects and then carbonized to form shaped carbonaceous materials of the present invention. Examples of shapes or forms include powders, granules, monoliths, beads, sheets, blocks, threads, filaments, tubes, papers, membranes, felts, foams, plates, fabrics and nonwovens. Shaping and molding techniques include but are not limited to compression molding and injection molding. Powders can be produced using milling techniques well known to those skilled in the art.

To produce the macroreticular carbonaceous material useful in the present invention, macroreticular resin or polymer precursors are pyrolyzed under inert or activating atmosphere. The pyrolysis temperature is for example from about 500 to 2000° C., another example is between 700 and 1500° C. and yet another example is between 800 and 1200° C. The pyrolysis time is typically between 1 and 12 hours, a further example is between 2 and 10 hours and yet another example is between 3 and 8 hours. The pyrolysis atmosphere can be either inert or activating or combinations of both. Inert pyrolysis atmosphere involves the use of inert, non-oxidizing gases such as nitrogen, argon, or helium. Activating atmospheres involve the use of, for example, carbon monoxide, carbon dioxide, steam or air. Alternatively chemical activation can be accomplished using alkali hydroxide such as potassium hydroxide, mineral acids such as sulfuric acid or Lewis acids such as zinc dichloride.

An example of a macroreticular carbonaceous material produced by the pyrolysis of a macroreticular resin or polymer precursor is the pyrolysis of a phenol/formaldehyde polymer wherein the phenol/formaldehyde polymer is formed by a base catalyzed condensation reaction of phenol with formaldehyde at a phenol/catalyst ratio of less than 50. An example of these types of macroreticular resins or polymer precursors is commercially available from the Rohm and Haas Company under the name Amberlite™ XAD761.

The macroreticular carbonaceous material useful for the present invention has a pore distribution of micropores, mesopores and macropores. The pore size of pores less than or equal to 20 angstroms was determined using argon adsorption isotherms and the Horvath-Kawazoe (H-K) pore size analysis. The pore size of pores greater than 17 angstroms was determined using nitrogen adsorption/desorption isotherms and the Barrett-Joyner-Halenda (BJH) pore size analysis. The surface area was determined using Brunauer, Emmett, Teller (BET) method of analysis. The macroreticular carbonaceous material can be characterized by having, for example, a BJH pore size distribution wherein 20 to 80% of the total surface area is due to pores with diameters of from 17 angstroms to 100,000 angstroms, a BJH pore size distribution wherein 24 to 60% of the total surface area is due to pores with diameters of from 17 angstroms to 100,000 angstroms, or, yet as a further example a BJH pore size distribution wherein 24 to 60% of the total surface area is due to pores with diameters of from 17 angstroms to 3000 angstroms. For example, a macroreticular carbonaceous material useful in the present invention was found to have a total BET surface area of 2025 $m^2/g$ and a BJH desorption cumulative surface area of pores between 17 angstroms and 100,000 angstroms of 576 $m^2/g$. This macroreticular carbonaceous material would have 28% of the total surface area due to pores with diameters of from 17 angstroms to 100,000 angstroms.

The surface area of the macroreticular carbonaceous material is determined using the BET method. The macroreticular carbon material can have a surface area of, for example, from greater than 500 $m^2/g$ to 2500 $m^2/g$, as a further example the surface area can be from 800 $m^2/g$ to 2500 $m^2/g$, yet another example is a surface area of 1000 $m^2/g$ to 2500 $m^2/g$, and another example is 1300 $m^2/g$ to 2500 $m^2/g$ and yet another example is 1500 $m^2/g$ to 2500 $m^2/g$.

According to the present invention, the energy storage device can be a capacitor comprising at least one electrode containing macroreticular carbonaceous material, such as described above. An example of such a capacitor comprises an organic type electrolyte solution obtained by dissolving an electrolyte into an organic solvent. The electrolyte solution used with the carbonaceous material useful in the present invention can comprise either an organic or aqueous electrolyte solution. One example, an organic electrolyte solution, displays at least twice the decomposition voltage than that of an aqueous electrolyte solution and since the energy density of the capacitor is proportional to half the product of the capacitance and the square of the voltage much higher energy density can be obtained. However, since the resistance of the organic electrolyte is higher than that of an aqueous electrolyte, the speed at which the capacitor can be cycled decreases dramatically. Thus another aspect of the present invention is a carbon based energy storage device wherein capacitance decreases less than 100% in an organic electrolyte and less than 75% in an aqueous electrolyte in going from 0.1 Hz to 1000 Hz.

The energy storage device of the present invention can be used as, for example, a capacitor, a battery, a fuel cell, a power stabilization device, or an electrocapacitive deionization device. Examples of capacitors include ultracapacitors and asymmetric capacitors. There are many end uses for the energy storage devices of the present invention. Some of these end uses are for example in automobile applications, power quality, engine starting, energy storage in photovoltaic, energy storage in windmills, medical applications, mobile propulsion systems, military and defense electronics, transportation systems, business and commercial electronics, consumer electronics, audio systems, and consumer appliances.

EXAMPLE 1

A macroreticular Phenol-Formaldehyde Condensate Polymer, Amberlite™ XAD761, Commercially Available from the Rohm and Haas Company, has the Following Range of Properties:

Moisture Holding Capacity: 60-65%

Bulk density wet: 0.550-0.650 g/ml

Bulk density dry: 0.200-0.400 g/ml

Surface area: 100-300 $m^2/g$

Porosity: 0.6 $cm^3/g$-1.3 $cm^3/g$

Average Pore diameter: 100 Å-500 Å

This commercially available material was dried by heating at 100° C. for 12 hours under vacuum.

The above macroreticular phenol-formaldehyde condensate polymer was pyrolyzed accordingly:

A dried 60 gram sample of XAD761 having a surface area of 272 $m^2/g$ and a porosity of 1.02 $cm^3/g$ was placed into a tube furnace at room temperature. A 2 L/min nitrogen flow was then started and after 60 minutes the sample was heated to 200° C. at a rate of 10° C./min. The sample was held at 200° C. for 30 minutes and then heating up to 1000° C. was continued at a rate of 5° C./min. Upon reaching 1000° C., the sample was held for 1 hour and then a 2 L/min carbon dioxide flow was started and continued for 3 additional hours at 1000° C. The macroreticular carbonaceous material was found to have a total surface area of 1321 $m^2/g$, a total porosity of 1.62 $cm^3/g$ and a distribution of micropores and mesopores and macropores with pore diameters of from 17 Å to 100,000 Å accounting for 48% of the total surface area. The macroreticular carbonaceous material was then ground to a particle size of less than 20 microns.

EXAMPLE 2

Alternative Pyrolysis of the Example 1 Macroreticular Phenol-Formaldehyde Condensate Polymer The macroreticular polymer of Example 1 was prepared with a 2 hour carbon dioxide activation step. The macroreticular carbonaceous material sample was found to have a total surface area of 923 $m^2/g$, a total porosity of 1.10 $cm^3/g$ and a distribution of micropores and mesopores and macropores with pore diameters of from 17 Å to 100,000 Å accounting for 37% of the total surface area. The macroreticular carbonaceous material was then ground to a particle size of less than 20 microns.

EXAMPLE 3

A dried 60 gram sample of XAD761 having a surface area of 210 m$^2$/g and a porosity of 0.548 cm$^3$/g was placed into a tube furnace at room temperature. A 2 L/min nitrogen flow was then started and after 60 minutes the sample is heated to 200° C. at a rate of 10° C./min. The sample was held at 200° C. for 30 minutes and then heating up to 1000° C. was continued at a rate of 5° C./min. Upon reaching 1000° C., the sample was held for 1 hour and then a 2 L/min carbon dioxide flow was started and continued for 3 additional hours at 1000° C. The macroreticular carbonaceous material was found to have a total surface area of 1587 m$^2$/g, a total porosity of 1.14 cm$^3$/g and a distribution of micropores and mesopores and macropores with pore diameters of from 17 Å to 100,000 Å accounting for 28% of the total surface area. The macroreticular carbonaceous material was then ground to a particle size of less than 20 microns.

EXAMPLE 4

A Macroreticular Crosslinked Acrylonitrile Copolymer

To a 1 liter round bottom flask equipped with a condenser, mechanical stirrer and thermocouple was added 300 grams of an aqueous phase containing a suspension stabilizing agent. With stirring, 151.5 grams of an organic phase containing 60 grams of 4-methyl-2-pentanol, 60 grams of acrylonitrile, 30 grams of 55% divinylbenzene and 1.5 grams of AIBN were added. Stirring was maintained at 150 rpm to form droplets and the reaction was heated to 70° C. and held at 70° C. for 12 hours. The 4-methyl-2-pentanol was stripped from the polymer beads via distillation and the polymer beads were washed several times with DI water. The final macroporous copolymer beads were then dried under vacuum at 60° C. for 12 hours.

EXAMPLE 5

Pyrolysis of Said Macroreticular Crosslinked Acrylonitrile Copolymer

A dried 25 gram sample of the macroreticular crosslinked acrylonitrile copolymer was placed into a tube furnace at room temperature. An air flow of 0.06 L/min was then started and the sample was heated from room temperature to 200° C. at a rate of 5° C./min. The sample was held at 200° C. under air for 10 hours. The atmosphere was then changed to nitrogen and the sample heated to 850° C. at 10° C./min. Upon reaching 850° C. the sample was held for 1 hour and allowed to cool to under nitrogen. The macroreticular carbonaceous material was found to have a total surface area of 1200 m$^2$/g, a total porosity of 1.0 cm$^3$/g and a distribution of micropores and mesopores and macropores with pore diameters of from 17 Å to 100,000 Å accounting for 27% of the total surface area. The macroreticular carbonaceous material was then ground to a particle size of less than 20 microns.

Capacitance Measurements

Test Equipment
Frequency Response Analyzer (FRA), Schlumberger Solartron Model 1250
  Potentiostat, EG&G Model 273
  Digital Multimeter, Keithley Model 197
  Capacitance test box S/N 005, 100 ohm setting
  RCL Meter, Philips PM6303
  Power Supply, Hewlett-Packard Model E3610A
  Balance, Mettler H10
  Micrometer, Brown/Sharp
  Leakage current apparatus
  Battery/capacitor tester, Arbin Model HSP-2042

Organic Electrolyte Capacitors

The carbon samples were evaluated for their properties and performance as electrodes in an electrochemical capacitor having an organic electrolyte. The commercially available carbon BP-15 manufactured by Kuraray Chemical Company was obtained and was used for comparative purposes. All were in particulate form and formed into electrodes that had a diameter of 1.59 cm and were 0.005 cm thick. The separator was –0.0076 cm thick. The electrodes were dried under vacuum conditions (mechanical roughing pump) at 195° C. for 18 hours prior to soaking in electrolyte in the last preparation step. The cooled electrode disks (still under vacuum) were transferred into the drybox. All subsequent assembly work was performed in the drybox. The electrode discs were soaked in the organic electrolyte for 10 minutes then assembled into cells. The electrolyte was an equal volume mixture of propylene carbonate (PC) and dimethyl carbonate (DMC) that contained 1.0 M of tetraethylammonium tetra fluoroborate salt (TEATFB). The separator was the "open cell foam type" material that was approximately 0.0076 cm thick when assembled in a cell. Assembled cells were removed from the drybox for testing. Metal plates were clamped against each conductive face-plate and used as current collectors. Capacitor cells were conditioned at 1.0 V for ten minutes, measured for properties, then conditioned at 2.0 V for 10 minutes and measured for properties.

Test Measurements

The following examples demonstrate that the macroreticular carbons of the present invention have high capacitance, high FOM, low equivalent series resistance (ESR) and fast response times in organic electrolyte. All measurements were performed at room temperature. The sequence at 1.0 V was as follows: 1 kHz ESR using the RCL meter, charging capacitance with a 100 ohm series resistance using the capacitance test box, leakage current after 30 minutes using the leakage current apparatus, electrochemical impedance spectroscopy (EIS) measurements using the potentiostat and FRA. Then the cell was raised in voltage to 2.0 V for 10 minutes conditioning before performing the same sequence of tests. The final measurements were constant current charge/discharge measurements using the Arbin. EIS measurements were made in a four-lead configuration with a 0.010-V-amplitude sine-wave-signal.

The C100 charging capacitance was determined by measuring the time to charge the capacitor from 0 V to (1-1/e)·V=0.632·V after application of 1.0 or 2.0 V through the capacitor and a 100 Ω resistor connected in series. Capacitance (in F) was then calculated by dividing the charge time (in seconds) by 100 (the series resistance value). Response time was the product of the 1 kHz ESR and the C100 capacitance. Leakage current was measured by applying the test voltage to the capacitor through a 10 ohm series resistance, then measuring the voltage across this resistor with the multimeter. Then the voltage was raised to 2.0 V and leakage current was again recorded after 30 minutes. The characteristic time was determined as the reciprocal of the frequency ($f_o$) at which the impedance reaches –45° phase angle. Energy was derived from the impedance value at that same frequency. The FOMs are equal to the gravimetric energy density divided by the characteristic time. Capacitance loss as a function of frequency was determined at a 1.5 V bias using impedance data represented as a series-RC circuit.

TABLE I

Test results of capacitors constructed using the macroreticular carbonaceous material described in Examples 1, 2 and 3 using organic electrolyte. Reported values were after conditioning at 1.0 V.

| Carbon | Total Surface area $m^2/g$ | Surface area pores (17-100,000 Å) $m^2/g$ | 1 kHz ESR (Ω) | Capacitance at 2 Volts (F/g) | Response Time $\tau = RC$ (sec) | FOM (W/g) | Capacitance loss from 0.1 Hz to 1000 Hz at a 1.5 V bias |
|---|---|---|---|---|---|---|---|
| Example 1 | 1321 | 647 | 1.45 | 79 | 0.19 | 20 | 96% |
| Example 2 | 923 | 344 | 1.075 | 56 | 0.24 | 12 | 86% |
| Example 3 | 1587 | 422 | 1.42 | 95 | 0.36 | 11 | 97% |
| Comparative Example BP-15 | 1605 | 228 | 1.85 | 90 | 0.65 | 3.5 | 100% |

Aqueous Sulfuric Acid Electrolyte Capacitors

The carbon samples were evaluated for their properties and performance as electrodes in an electrochemical capacitor having an aqueous sulfuric acid electrolyte. All were in particulate form and were fabricated and wet with electrolyte. The electrode pairs were assembled into prototype capacitor cells as described above using a 0.0025 cm thick microporous separator, thermoplastic edge seal material, and conductive face-plates. The perimeter edge sealing was performed using an impulse heat sealer that minimized heat input into the cells. Metal plates were clamped against each conductive face-plate and used as current collectors. Capacitor cells were conditioned at 1.0 V for ten minutes at 60° C. and measured for properties.

Test Measurements

The following examples demonstrate that the macroreticular carbons of the present invention have high capacitance, high figure of merit (FOM), low ESR and fast response times in aqueous electrolyte. All measurements were performed at room temperature. The sequence was as follows: 1 kHz equivalent series resistance (ESR) using the RCL meter, charging capacitance with a 100 ohm series resistance using the capacitance test box, leakage current at 0.5, 0.75, and 1.0 V after 30 minutes using the leakage current apparatus, electrochemical impedance spectroscopy (EIS) measurements using the potentiostat and FRA at three bias voltages, and finally charge/discharge measurements using the Arbin. EIS measurements were made in a four-lead configuration, with a 0.010-V-amplitude sine-wave-signal at dc bias voltages of 0.5, 0.75, and 1.0 V, and over the frequency range 65 kHz to typically 0.01 Hz.

C100 charging capacitance was determined by measuring the time to charge the capacitor from 0-V to $(1-1/e) \cdot V = 0.632 \cdot V$ after application of 1.0 V through the capacitor and a 100 Ω resistor connected in series. Capacitance (in F) was then calculated by dividing the charge time (in seconds) by 100 (the series resistance value). Response time was the product of the 1 kHz ESR and the C100 capacitance. Leakage current was measured by applying the test voltage to the capacitor through a 10 ohm series resistance, then measuring the voltage across this resistor with the multimeter. Leakage current was recorded 30 minutes after 0.5 V was applied to a capacitor. Then the voltage was raised to 0.75 V and leakage current was again recorded after 30 minutes. Then the voltage was raised to 1.0 V and leakage current was again recorded after 30 minutes. The characteristic time was determined as the reciprocal of the frequency at which the impedance reaches −45° phase angle. Energy was derived from the impedance value at that same frequency. The FOMs were equal to the gravimetric energy density divided by the characteristic time. Capacitance loss as a function of frequency was determined at a 0.75 V bias using impedance data represented as a series-RC circuit.

TABLE II

Test results of capacitors constructed with the macroreticular carbonaceous material described in Examples 1 and 2 using an aqueous electrolyte. Reported values were after conditioning at 1.0 V.

| Carbon | Total Surface area $m^2/g$ | Surface area pores (17-100,000 Å) $m^2/g$ | 1 kHz ESR (Ω) | Capacitance (F/g) | Response Time $\tau = RC$ (sec) | FOM (W/g) | Capacitance loss from 0.1 Hz to 1000 Hz at a 0.75 V bias |
|---|---|---|---|---|---|---|---|
| Example 1 | 1321 | 647 | 0.071 | 160 | 0.026 | 38 | 60% |
| Example 2 | 923 | 344 | 0.088 | 134 | 0.028 | 39 | 62.5% |
| Comparative Example BP-15 | 1605 | 228 | 0.103 | 180 | 0.072 | 36 | 95% |

EXAMPLE 6

Capacitive Water Deionization Using Electrodes Containing Macroreticular Carbonaceous Material Two electrodes containing macroreticular carbonaceous material having a surface area of 509 $m^2/g$, a total porosity of 1.10 $cm^3/g$ and a distribution of micropores and mesopores and macropores with pore diameters of from 17 Å to 100,000 Å accounting for 52% of the total surface area produced by the carbonization of a macroreticular phenol-formaldehyde condensate polymer sheet were placed into a sample cell. Between the carbonaceous electrodes was a spacer made of polypropylene mesh (5 cm by 5 cm by 0.1 cm). On the outside of the carbonaceous electrodes were Ti mesh electrodes. The entire electrode assembly was placed into a holder made of 0.6 cm thick acrylic sheet. The front, back, and sides were sealed. Appropriate openings were made on the top and bottom for tubing fittings to carry the aqueous solutions into and out of the cell and electrical connections to the Ti electrodes.

Water containing NaCl (5.8 meq/L, 340 mg/L) was pumped from a reservoir, through the sample cell, through a conductivity cell, and back to the reservoir. Initial solution conductivities were 0.700 mS/cm. Flow rates were 1 mL/min. The electrical circuit consisted of a DC power supply, a digital voltmeter in parallel with the carbonaceous electrodes, and a digital ammeter in series with the carbonaceous electrodes. A computer based data acquisition system recorded potential, current, and effluent conductivity as a function of elapsed time. When a potential of 1.2 V was applied to the carbonaceous electrodes, an initial current of 80 mA was recorded. The current decreased to a value of 3 mA over a period of 4 hours. Simultaneously, an initial decrease in effluent solution conductivity was observed, reaching a minimum of 0.35 mS/cm. This is indicative of a 50% reduction in ionic concentration as ions were electrostatically attracted to the carbonaceous electrodes. The conductivity then slowly returned to the initial value over the 4 hr loading period. When the carbonaceous electrodes were shorted together, an initial current of −80 mA was recorded, which then decreased to −0.1 mA over a 3 hour period. Simultaneously, an initial increase in effluent solution was observed, reaching a maximum of 1.8 mS/cm. This is indicative of a significant increase in ionic concentration as ions were released by the carbonaceous electrodes. The conductivity then returned to the initial value over the 3 hour regeneration period. The difference between the influent and effluent concentrations times the flow rate when integrated over the entire elapsed time provides the total charge adsorbed or desorbed from the carbonaceous electrodes. For this experiment the integral estimates 350 µeq of ions were adsorbed and 370 µeq were desorbed. The integral of the current vs. time curve provides the total charge of electrons supplied to or removed from the carbonaceous electrodes.

We claim:

1. An energy storage device comprising a macroreticular carbonaceous material having a distribution of micropores, mesopores and macropores wherein the macroreticular carbonaceous material has a total porosity of at least 1.0 $cm^3/g$, a total surface area of from greater than 500 $m^2/g$ to 2500 $m^2/g$ and wherein 20% to 80% of the total surface area is due to pores with diameters of from 17 angstroms to 100,000 angstroms; wherein the distribution of micropores, mesopores and macropores is bimodal; wherein measurement of pore size distribution of the macroreticular carbonaceous material yields a first distinct peak representing a pore size of less than or equal to 20 angstroms when measured utilizing H-K dv/dlog(W) pore size distribution and a second distinct peak representing a pore size greater than 100 angstroms when measured utilizing BJH dv/dlog(D) pore size distribution; wherein micropores have diameters less than 20 angstroms, mesopores have diameters from 20 to 500 angstroms and macropores have diameters greater than 500 angstroms.

2. The energy storage device according to claim 1 wherein the macroreticular carbonaceous material has a total surface area of from greater than 800 $m^2/g$ to 2500 $m^2/g$.

3. The energy storage device according to claim 1 wherein 24% to 60% of the total surface area is due to pores with diameters of from 17 angstroms to 100,000 angstroms.

4. An energy storage device comprising a carbonaceous material having a total porosity of at least 1.0 $cm^3/g$ and a bimodal pore size distribution; wherein measurement of pore size distribution of the carbonaceous material yields a first distinct peak representing a pore size less than 20 angstroms when measured utilizing H-K dv/dlog(W) pore size distribution and a second distinct peak representing a pore size greater than 125 angstroms when measured utilizing BJH dv/dlog(D) pore size distribution.

5. The energy storage device of claim 1 or claim 4 where the energy storage device is a capacitor, a battery, a fuel cell, a power stabilization device, or an electrocapacitive deionization device.

6. The carbonaceous material of claim 1 or claim 4 wherein figure of merit is measured and is greater than 5 W/g in organic electrolyte and greater than 25 W/g in aqueous electrolyte.

7. The carbonaceous material of claim 1 or claim 4 wherein the carbonaceous material is in a form selected from the group consisting of powders, granules, monoliths, beads, sheets, blocks, threads, filaments, tubes, papers, membranes, felts, foams, plates, fabrics and nonwovens.

* * * * *